(12) United States Patent
Ainsworth, III et al.

(10) Patent No.: US 10,354,311 B2
(45) Date of Patent: Jul. 16, 2019

(54) DETERMINING PREFERENCES OF AN ENSEMBLE OF ITEMS

(71) Applicant: Comenity LLC, Columbus, OH (US)

(72) Inventors: Richard Barber Ainsworth, III, Dublin, OH (US); Adam Koltnow, Worthington, OH (US)

(73) Assignee: Comenity LLC, Columbus, OH (US)

( * ) Notice: Subject to any disclaimer, the term of this patent is extended or adjusted under 35 U.S.C. 154(b) by 3 days.

(21) Appl. No.: 14/508,941

(22) Filed: Oct. 7, 2014

(65) Prior Publication Data

US 2016/0098776 A1 Apr. 7, 2016

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0631* (2013.01); *G06Q 30/0623* (2013.01); *G06Q 50/01* (2013.01)

(58) Field of Classification Search
CPC .............. G06Q 30/02; G06Q 30/0631; G06Q 30/0633; G06Q 30/0269; G06Q 30/0254; G06Q 30/0255; G06Q 30/0256; G06Q 30/0609; G06Q 30/0613; G06Q 30/0612; G06Q 30/0601–0645; G06Q 30/0201–0203; G06Q 30/06; G06Q 30/08; G06Q 50/01
USPC ............................................... 705/26.1–27.2
See application file for complete search history.

(56) References Cited

U.S. PATENT DOCUMENTS

| | | | |
|---|---|---|---|
| 6,751,620 B2 | 6/2004 | Orbanes et al. |
| 7,175,079 B1 | 2/2007 | Silverbrook et al. |
| 7,627,502 B2 | 12/2009 | Cheng et al. |
| 7,712,035 B2 | 5/2010 | Giannini |
| 7,756,752 B2 | 7/2010 | Duvall et al. |
| 8,078,499 B1 | 12/2011 | Gianinni et al. |
| 8,103,551 B2 | 1/2012 | Saul et al. |
| RE43,220 E | 2/2012 | Tillman |
| 8,117,085 B1 | 2/2012 | Smith |
| 8,346,625 B2 | 1/2013 | Song |
| 8,370,203 B2 | 2/2013 | Dicker et al. |
| 8,438,081 B2 | 5/2013 | Gray et al. |
| 8,560,398 B1 | 10/2013 | Gregov et al. |
| 8,621,359 B2 | 12/2013 | Cao et al. |
| 9,710,841 B2 | 7/2017 | Ainsworth, III et al. |
| 9,953,357 B2 | 4/2018 | Ainsworth et al. |
| 2002/0169657 A1 | 11/2002 | Singh et al. |
| 2003/0083925 A1 | 5/2003 | Weaver et al. |

(Continued)

OTHER PUBLICATIONS

Commerce That's Curated Just for You. Vikram Alexei Kansara. www.BusinessOfFashion.com. May 15, 2012 14:49 (Year: 2012).*

(Continued)

*Primary Examiner* — William J Allen

(57) ABSTRACT

In a non-transitory computer-readable storage medium having instructions embodied therein that when executed cause a computer system to perform a method for determining preferences of an ensemble of items. An ensemble of items is accessed, wherein the ensemble is user created, and wherein the ensemble of items is shared such that the ensemble of items is viewed by others. User activity associated with the ensemble of items is tracked. Preference information of the ensemble of items is determined based on the tracked user interaction.

16 Claims, 11 Drawing Sheets

(56) References Cited

U.S. PATENT DOCUMENTS

| | | |
|---|---|---|
| 2006/0041843 A1 | 2/2006 | Billsus et al. |
| 2007/0130020 A1 | 6/2007 | Paolini |
| 2007/0198120 A1 | 8/2007 | Wannier et al. |
| 2008/0174682 A1 | 7/2008 | Faisman et al. |
| 2008/0177640 A1 | 7/2008 | Gokturk et al. |
| 2008/0195507 A1 | 8/2008 | Ratnakar |
| 2008/0215470 A1 | 9/2008 | Sengupta et al. |
| 2008/0295037 A1 | 11/2008 | Cao et al. |
| 2009/0037295 A1 | 2/2009 | Saul et al. |
| 2009/0094260 A1 | 4/2009 | Cheng et al. |
| 2009/0307057 A1 | 12/2009 | Azout et al. |
| 2010/0017272 A1 | 1/2010 | Gianinni et al. |
| 2010/0030578 A1 | 2/2010 | Siddique et al. |
| 2010/0030663 A1 | 2/2010 | Wannier et al. |
| 2010/0077640 A1 | 4/2010 | Randall |
| 2010/0094729 A1* | 4/2010 | Gray ............... G06Q 30/06 705/26.1 |
| 2010/0100455 A1 | 4/2010 | Song |
| 2010/0191582 A1* | 7/2010 | Dicker ............... G06Q 30/02 705/14.51 |
| 2010/0191770 A1 | 7/2010 | Cho et al. |
| 2010/0228646 A1 | 9/2010 | Heidel |
| 2010/0313141 A1* | 12/2010 | Yu ............... G06F 17/30702 715/747 |
| 2011/0184780 A1 | 7/2011 | Alderson et al. |
| 2011/0282821 A1 | 11/2011 | Levy et al. |
| 2012/0054622 A1 | 3/2012 | Nankani |
| 2012/0144325 A1 | 6/2012 | Mital et al. |
| 2012/0185996 A1 | 7/2012 | Goldberg et al. |
| 2012/0221433 A1 | 8/2012 | Plattsmier et al. |
| 2013/0159826 A1* | 6/2013 | Mason ............... G06F 17/30873 715/205 |
| 2013/0185642 A1 | 7/2013 | Gammons |
| 2013/0215116 A1 | 8/2013 | Siddique et al. |
| 2013/0268377 A1 | 10/2013 | Jessup et al. |
| 2013/0346234 A1* | 12/2013 | Hendrick ............... G06Q 30/0631 705/26.7 |
| 2014/0019281 A1 | 1/2014 | O'Dell |
| 2014/0035913 A1* | 2/2014 | Higgins ............... G06T 17/00 345/420 |
| 2014/0067596 A1* | 3/2014 | McGovern ............... G06Q 30/02 705/26.7 |
| 2014/0089135 A1* | 3/2014 | Linh ............... G06Q 30/0601 705/26.7 |
| 2014/0279197 A1 | 9/2014 | Ainsworth, III et al. |
| 2014/0280176 A1 | 9/2014 | Berk et al. |
| 2014/0330670 A1 | 11/2014 | Ainsworth, III et al. |
| 2014/0337112 A1* | 11/2014 | Dessert ............... G06Q 30/0267 705/14.23 |
| 2014/0379426 A1 | 12/2014 | Guo et al. |
| 2015/0088684 A1* | 3/2015 | Nygaard ............... G06Q 30/0631 705/26.7 |
| 2015/0095184 A1 | 4/2015 | Ainsworth et al. |
| 2015/0095187 A1 | 4/2015 | Ainsworth et al. |
| 2015/0106995 A1 | 4/2015 | Ampofo et al. |
| 2015/0142550 A1 | 5/2015 | Owen et al. |
| 2015/0161674 A1 | 6/2015 | Khoury et al. |
| 2015/0170250 A1 | 6/2015 | Dalal et al. |
| 2015/0186965 A1 | 7/2015 | Salsberg |
| 2015/0379006 A1 | 12/2015 | Dorner et al. |
| 2016/0042402 A1 | 2/2016 | Gadre et al. |
| 2016/0048853 A1 | 2/2016 | Bhattacharjya et al. |
| 2016/0098775 A1 | 4/2016 | Ainsworth, III et al. |
| 2016/0098784 A1 | 4/2016 | Ainsworth, III et al. |
| 2016/0140639 A1 | 5/2016 | Ainsworth, III et al. |
| 2016/0210602 A1 | 7/2016 | Siddique et al. |

OTHER PUBLICATIONS

"10 Awesome jQuery Tag Cloud Plugins", websanova.com Accessed Jan. 31, 2017.

"Add Label Cloud 3D Rotating Label", ietchankun.blogspot.com. Accessed Jan. 31, 2017, Jun. 23, 2011.

* cited by examiner

700

ACCESS ENSEMBLES OF RETAIL ITEMS, WHEREIN THE RETAIL ITEMS ARE PROVIDED BY A RETAILER, AND WHEREIN THE ENSEMBLES OF RETAIL ITEMS ARE CREATED BY ENTITIES OTHER THAN THE RETAILER
710

CONTROL THE ENSEMBLES OF RETAIL ITEMS BY THE RETAILER
720

CONTROL RECOMMENDATIONS OF THE ENSEMBLES
722

CONTROL DISPLAY OF THE ENSEMBLES
724

PROVIDE RECOMMENDATION SIGNIFICANCE TO THE RETAILER THAT IS HIGHER THAN A RECOMMENDATION SIGNIFICANCE TO OTHER VIEWERS OF THE ENSEMBLES
726

CONTROL RANKINGS OF THE ENSEMBLES WITH RESPECT TO EACH OTHER
728

INCENTIVIZE PURCHASE OF THE ENSEMBLE OF ITEMS
730

```
┌─────────────────────────────────────────────────────────┐
│   DETERMINE AN ITEM IN AN ENSEMBLE OF ITEMS IS          │
│            UNAVAILABLE FOR PURCHASE                      │
│                      1110                                │
└─────────────────────────────────────────────────────────┘
                          │
                          ▼
┌─────────────────────────────────────────────────────────┐
│     ANALYZE USER ACTIVITY ASSOCIATED WITH THE ITEM       │
│                      1120                                │
└─────────────────────────────────────────────────────────┘
                          │
                          ▼
┌─────────────────────────────────────────────────────────┐
│  PRESENT A REPLACEMENT ITEM SIMILAR TO THE ITEM THAT    │
│  IS UNAVAILABLE FOR PURCHASE, WHEREIN THE               │
│  REPLACEMENT ITEM IS GENERATED BASED, IN PART, ON THE   │
│                    ANALYZING                             │
│                      1130                                │
└─────────────────────────────────────────────────────────┘

┌─────────────────────────────────────────────────────────┐
│   PERFORM A COLOR PALETTE ANALYSIS OF THE ITEM,         │
│  WHEREIN THE REPLACEMENT ITEM IS GENERATED BASED,       │
│     IN PART, ON THE COLOR PALETTE ANALYSIS              │
│                      1140                                │
└─────────────────────────────────────────────────────────┘
```

FIG. 11

DETERMINING PREFERENCES OF AN ENSEMBLE OF ITEMS

RELATED APPLICATIONS

This application is related to U.S. Pat. No. 9,953,357 B2 entitled "SHARING AN ENSEMBLE OF ITEMS," by Richard Barber Ainsworth III et al., and assigned to the assignee of the present application.

This application is related to co-pending U.S. Application No. 14/508,962, filed on Oct. 7, 2014, entitled "GENERATING A USER DASHBOARD ASSOCIATED WITH ENSEMBLES OF RETAIL ITEMS," by Richard Barber Ainsworth III et al., and assigned to the assignee of the present application.

BACKGROUND

Oftentimes it is difficult for a person to select his or her own clothing from a plurality of clothing items. For instance, the person may not have the confidence or experience to combine various items to create a fashionable collection of items.

Additionally, automatic recommendations of retail items may be provided to facilitate in the generation of an ensemble of apparel items. For example, a user is automatically recommended to purchase a brown belt in response of purchasing blue jeans. However, such recommendation of a brown belt may not actually be the best fashion choice with the blue jeans.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 7 depicts a flow diagram for a method for retailer control of ensembles of retail items, according to various embodiments.

FIG. 11 depicts a flow diagram for a method for item replacement matching, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Example Embodiments of a Retail System

Figure 1:
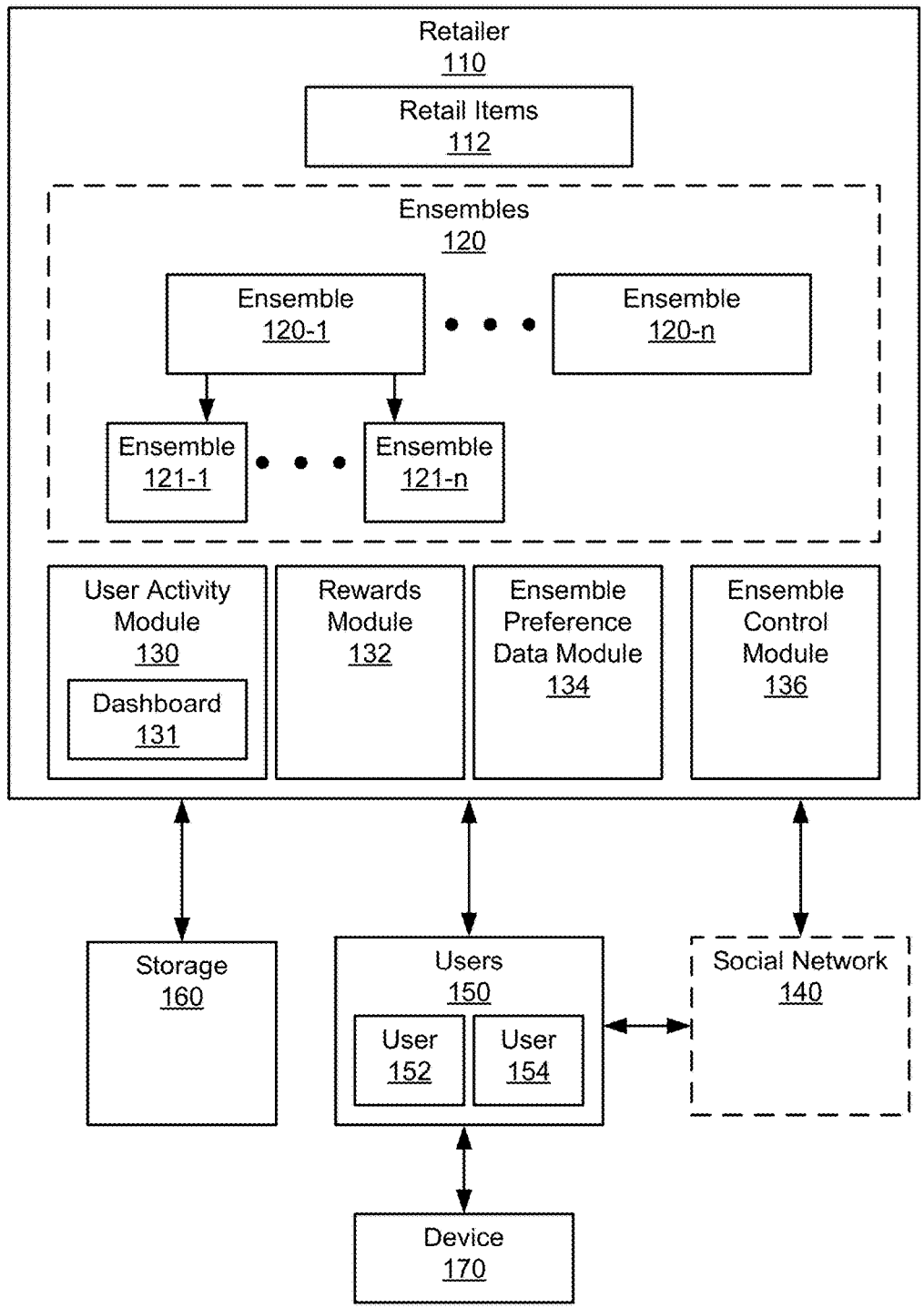
FIG. 1 is a block diagram that illustrates an embodiment of an online retail system for generating and sharing of ensembles of items.

FIG. 1 depicts an embodiment of online shopping system or "system" 100. In general, system 100 provides for the assembling, prioritizing, analyzing and presenting of ensembles of items (e.g., retail items) based on user-input and analysis of the user-input. More specifically, system 100 provides, among other things, the creation of ensembles of items (e.g., retail items) by users and posting/sharing of the ensembles such that others can view the ensembles. The posting/sharing of user created ensembles provides unaided brand awareness to the items in the ensembles.

Retailer 110 implements online shopping system 100. Retailer 110 (e.g., J. Crew, Talbots, Macy's, etc.) is any retailer that provides goods (e.g., apparel, accessories) for sale via online shopping system 100 and/or via brick and mortar stores.

Retailer 110 provides retail items 112 for sale to customers. Retail items 112 can be but are not limited to, clothing, shoes, glasses, hats, jewelry, accessories, etc. In various embodiments, retail items 112 are items of a retail collection or fashion/clothing line provided by retailer 110.

Retail items 112, such as apparel, in one embodiment, are provided by a single retailer (e.g., Victoria's Secret, J.Crew, etc.).

Retail items 112 are able to be viewed by users 150 via a website of retailer 110.

Example Embodiments of Ensembles of Retail Items

Ensembles 120 of retail items 112 are generated, by users 150, via system 100. In general, an ensemble is a set of retail items 112 (e.g., apparel and accessories, home furnishings, make-up, etc.) that are worn together.

Ensembles 120 may include an ensemble of home furnishings. For instance, retail items 112 includes home furnishings such as but not limited to couches, tables, lamps, etc. A user may then generate an ensemble of home furnishings based on viewing the various home furnishings.

Ensembles 120 may also include make-up (or cosmetic supplies). For instance, retail items 112 includes various cosmetic products such as but not limited to, foundation, mascara, eye liner, lipstick, etc. A user may then generate an ensemble of cosmetic supplies. In such an example, a generic face is used as a canvas and the user applies various combinations of cosmetic products on the canvas to create an ensemble of cosmetic products.

Ensembles 120 include ensemble 120-1 through ensemble 120-n. Ensemble 120-1 generated by user 152 may be inspiration to other ensembles. For example, ensembles 121-1 through 121-n are inspired by ensemble 120-n, and may be considered a child ensemble to the parent ensemble 120-1. The child ensembles may be generated by user 152 who created ensemble 120-1 or may be created by other users, such as user 154.

Figure 2A:
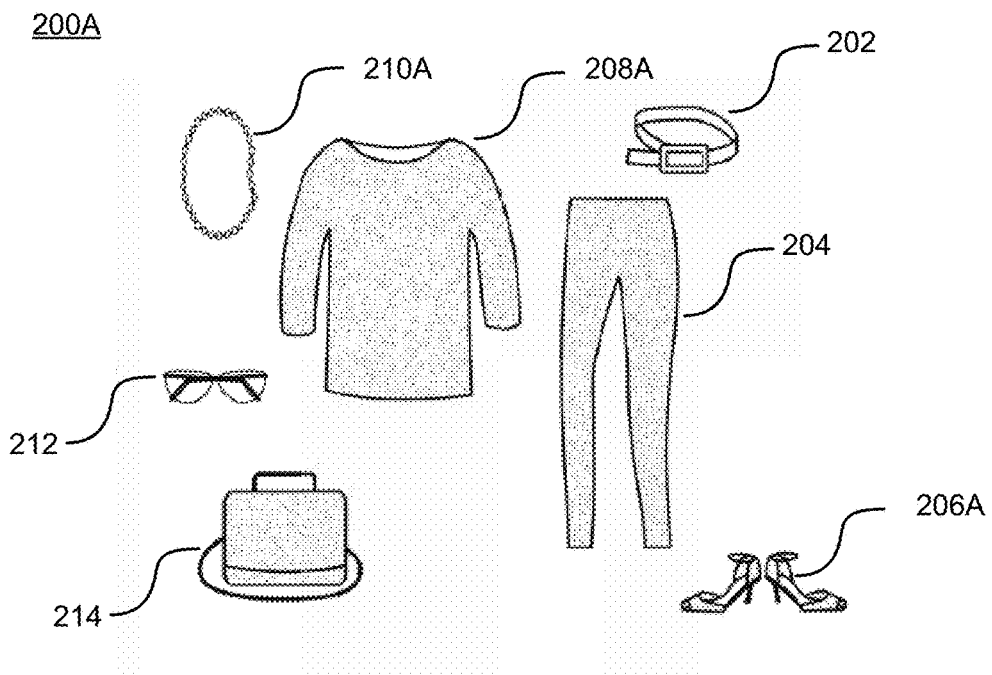
FIG. 2A is a block diagram that illustrates an embodiment of an ensemble.

FIG. 2A depicts an embodiment of ensemble 200A. Ensemble 200A is created, for example, by user 152, from retail items 112. As depicted, ensemble 200A includes belt 202, pants 204, shoes 206A, shirt 208A, necklace 210A, glasses 212, and handbag 214.

It should be appreciated that ensemble 200A is a collection of coordinated items that are fashionable and desirable for purchase by others. The ensemble typically includes colors, styles, patterns, materials, etc., and a combination thereof, that are currently fashionable and desirable to be worn by others.

Figure 2B:
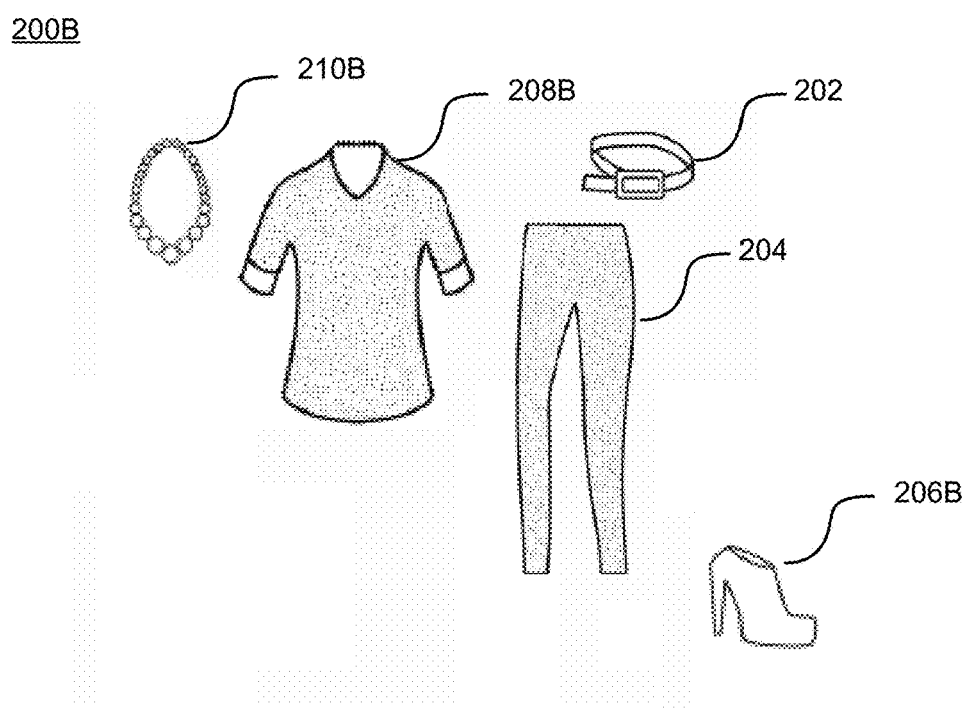
FIG. 2B is a block diagram that illustrates an embodiment of an ensemble.

FIG. 2B depicts an embodiment of ensemble 200B that is collection of retail items 112. Ensemble 200B is similar to ensemble 200A. However, ensemble 200B includes shoes 206B, shirt 208B, and necklace 210B. Moreover, unlike ensemble 200A, ensemble 200B does not include a handbag or glasses.

In one embodiment, ensemble 200A is a parent ensemble and ensemble 200B is a child ensemble. For example, user 152 created ensemble 200A. User 154 viewed ensemble 200A and was inspired by ensemble 200A to create ensemble 200B.

Ensembles 120, once created can be stored, for example, in storage 160.

Ensembles 120, in one embodiment, can be posted on a retail website such that the ensembles may be viewed by users 150. For example, ensemble 120-1 is created in a retail website (e.g., J. Crew) and is subsequently posted on the website such that users 150 can view ensemble 120-1.

It should be appreciated that the ensembles can be created by a user via the retailer website and subsequently viewed by others via the retailer ecommerce website. Additionally, the ensemble can be created by a user via a gateway associated with or embedded in the retailer ecommerce website. The gateway associated with the retailer website may be an online shopping system (or website) that facilitates in the display, selection, checkout and purchasing of retail items of the retailer.

Ensembles 120, in another embodiment, can be posted on social network 140 (e.g., Facebook, Pinterest, etc.) such that the ensembles may be viewed via the social network. For example, ensemble 120-1 is created in a retail website (e.g., J. Crew) and is subsequently posted on social network 140 such that users 150 can view ensemble 120-1 via social network 140. The users who view the ensemble on the social network may be associated (e.g., linked, connected, networked, friends, etc.) with the user who posted the ensemble on the social network.

The ensemble may be posted on the social network by the creator of the ensemble or may be posted by another person.

In various embodiments, ensembles may be presented by various means. For example, ensembles could be viewed by others in a printed catalog, presented to others in a fashion show, posted on signage (e.g., digital signage), or projected onto a screen (e.g. a wall or window at a retail store).

Example Embodiments of Tracking User Activity Associated with Ensembles

User activity pertaining to the ensembles is tracked, for example, by user activity module 130.

User activity module 130 facilitates the tracking of user activity associated with various ensembles. In one embodiment, the ensembles are able to be recommended. For example, ensemble 121-1 is posted on the retail website and on Facebook. Viewers of ensemble 121-1 are able to recommend the ensemble or show their interest in the ensemble by "liking" the ensemble.

Various user activities may suggest preferences and/or interest in an ensemble. For instance, the length of time an ensemble is viewed and/or the number of views (or repetitions) of the ensemble indicates the interest/curiosity of a viewer in the viewed ensemble.

Prioritizing and presenting of ensembles may be facilitated by color selection. For example, a user may request to see retail items and/or ensembles with the color blue. A pixel analyzer then analyzes the available retail items/ensembles with the color blue. Each image associated with the retail items/ensembles with the color blue is then presented and/or prioritized to the viewer based on the blue color selection.

Prioritizing and presenting of ensembles, in one embodiment, may be facilitated by theme. For example, each of the retail items/ensembles are tagged with descriptions or themes (e.g., beach wear, formal wear, business attire, etc.). A user may then request to view retail items/ensembles based on selected theme. As a result, each retail item and/or ensemble having a tag that matches the selected theme by the user is presented (e.g., ranked or sorted) based on the user selected theme.

Additionally, a viewer of the ensemble may post comments about the ensemble and such comments can also be liked by other users.

In various embodiments, the number of views of the ensemble or purchases of the ensemble may also be tracked by user activity module.

User activity module 130 may also track the number of child ensembles that are created from a parent ensemble.

Example Embodiments of a Points/Rewards System Associated with Ensembles

Various points and/or rewards are provided to the creators of the ensembles, as will be discussed in further detail below. The points/rewards, accounted by rewards module 132, incentivizes creation of quality and desired ensembles. The points/rewards may be based on the tracked user activity of the various ensembles.

In one embodiment, retailer 110 employs a points system based on various user activities associated with an ensemble. The points system may include various factors that increase the point values. For example, the point system may provide one point for each view of an ensemble, two points if an ensemble is "liked," fifty points if an ensemble is purchased, etc.

In another embodiment, a hierarchical or pyramid point scheme is employed. For example, user 152 creates parent ensemble 120-1 and user 154 modifies ensemble 120-1 to create ensemble 121-1. User 154 receives points for user activity associated with ensemble 121-1 (e.g., points for views, "likes", purchases, etc.). Moreover, user 152 also receives fractions of points for the user activity associated with ensemble 121-1 because user 152 created the parent ensemble 120-1.

In various embodiments, point multipliers may be obtained. For example, if an ensemble is viewed a predetermined number of times or is purchased a pre-determined number of times, then the creator of the ensemble receives twice as many points per user activity (e.g., views, "likes", purchases, etc.).

A creator of an ensemble may also obtain digital badges pertaining to user activity associated with the ensemble. The badges may indicate the favorability, quality, popularity of the ensemble.

In one embodiment, a creator of an ensemble may be rewarded by gaining early access to subsequent clothing lines. The sooner a user is able to view new items in a clothing line the sooner ensembles may be created. As a result, the user has the ability to create ensembles sooner than others and subsequently increase the opportunity to earn points.

A user may be rewarded with early access to clothing lines in various ways. In one embodiment, early access to clothing lines is based on a user's loyalty level in the retailer's loyalty program. For example, if a user obtains a "high tier" loyalty level then the early access is obtained. The user may increase loyalty levels based on the user's usage of the retailer's black label credit card.

In such an embodiment, user's having a lower loyalty levels may view the clothing lines, but may not be able to create ensembles. For example, the clothing lines may be "grayed out" such that the lower loyalty level users may not have permission to create ensembles.

In another embodiment, early access to clothing lines is obtained by earning a required amount of points in the points system, as described above.

Example Embodiments of Progressive Discounting of Ensembles

In various embodiments, progressive discounting of ensembles may be employed. For example, a retailer may employ a pricing scheme wherein if a user purchases three items in an ensemble, then a discount (e.g., 10% off) is provided for additional purchased items in the ensemble. This results in pricing fairness wherein the net price of an ensemble may be aligned with transaction economics.

Example Embodiments of Capturing Preference Data of Ensembles

User activity associated with an ensemble may provide preference data of the ensemble of items. That is, preferences to an ensemble, as a whole, or preferences to individual items in an ensemble may be obtained by a retailer based on user activity with the ensemble of items.

As described above, user activity module 130 tracks and determines user activity associated with an ensemble. Such user activity can be, but is not limited to views of an ensemble, likes of an ensemble, likes of individual items in an ensemble, purchases, etc.

Based on such user activity, in one embodiment, ensemble preference data module 134 determines various preferences associated with an ensemble. For example, if ensemble 200A is a high ranked ensemble to other ensembles, then it can be determined that users or potential customers have a preference for ensemble 200A than other ensembles.

In another example, pants 204 and shoes 206B of ensemble 200B have a high number of "likes" as compared to other items in other ensembles. As such, it can be determined that users or potential customers have a preference for pants 204 and shoes 206B, alone or in combination.

Preference attributes can be, but are not limited to, size, color, patterns, materials, etc., or a combination thereof.

Additionally, the preference information can be obtained by the retailer prior to information associated with actual purchases of the ensembles and/or items. Accordingly, a retailer may determine which ensembles and/or items are popular or have preferential attributes with potential customers.

Example Embodiments of Controlling Ensembles by a Retailer

Some of ensembles 120 may be less desirable than others. For instance, some ensembles may be poorly created with little or no sense of fashion or may be disingenuously created. In such cases, a retailer desires that such ensembles are not "surfaced" or that such ensembles are given a low priority than other more fashionable and desirable ensembles.

Accordingly, retailer 110 has at least some control over how an ensemble is "surfaced" or displayed and/or how the ensembles are prioritized with respect to one another. In other words, the retailer may override user created ensembles or has greater priority regarding displaying/prioritizing ensembles than general viewers/creators of the ensembles. For example, retailer 110 has a "super like" that has a value greater than a typical "like" provided by a user. In such an example, if an undesirable ensemble (e.g., ensemble 121-1) has more likes than a more desirable ensemble (e.g., ensemble 120-n), then retailer 110 may increase the priority of the more desirable ensemble over the undesirable ensemble by the "super like." The control of the ensemble may be provided via user instructions from the retailer or may be provided automatically via ensemble control module 136.

Example Embodiments of a Dashboard

As users 150 peruse through ensembles 120, various user activities are tracked by user activity module 130. At least some of the user activities are stored in storage 160. For example, user activities such as likes, transaction data (e.g., purchases), created ensembles and the like are stored.

A user's activities may be displayed in a digital portal such as a user dashboard. For example, dashboard 131 is a portal that displays user activities of user 152.

Figure 3:
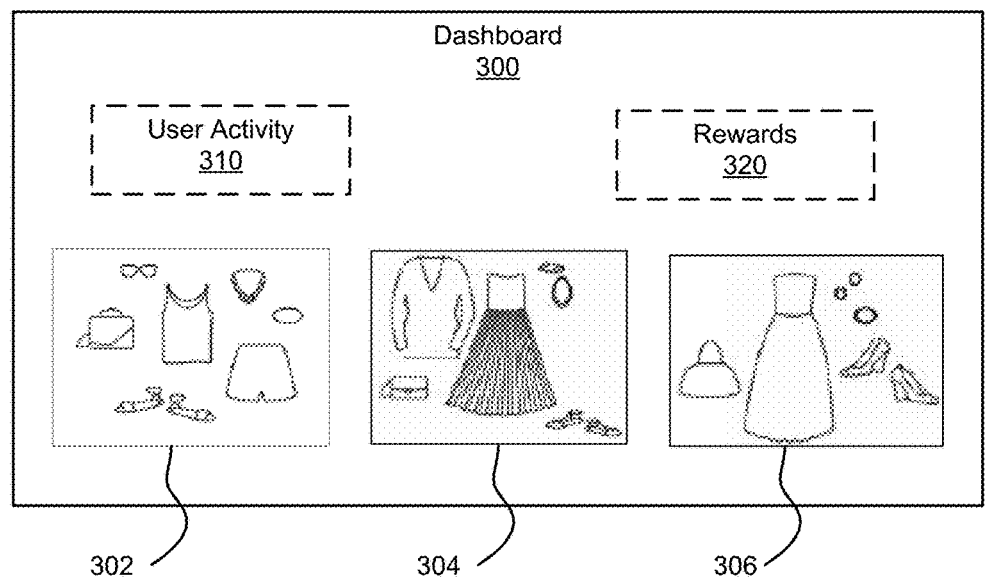
FIG. 3 is a block diagram that illustrates an embodiment of a user dashboard.

FIG. 3 depicts an embodiment of dashboard 300. Dashboard 300 displays to a user, user activity 310, rewards 320 and various ensembles (e.g., ensemble 302, ensemble 304, and ensemble 306).

User activity 310 can be, but is not limited to, number likes, ensembles liked, number of views, ensembles viewed, etc. In one embodiment, any ensemble that the user "liked" is automatically bookmarked for access via dashboard 300.

Rewards 320, can be, but are not limited to, number of points earned by the user, number of points needed to reach various goals (e.g., early access to ensembles), rewards (e.g., early access to ensembles), and the like.

The ensembles displayed in dashboard 300 may be the ensembles that the user created and/or ensembles that the user viewed, liked, purchased, etc.

It should be appreciated that dashboard 300 includes any information related to user activity pertaining to ensembles 120.

Dashboard 300 may be primarily used by a user. That is, dashboard 300 is a dashboard for a user who creates and/or views ensembles. Dashboard 300 may be for a retailer. That is, dashboard 300 is primarily for the use of a retailer such that the retailer can view various ensembles and user activities related to such ensembles.

Example Embodiments of a User Activity Via a Mobile Device

A user may interact with an ensemble via a mobile device. For example, user 152 accesses ensemble 120-1 via a mobile device. In such an example, the user receives push data (e.g., text, social network postings such as tweets) that includes an ensemble and the ensemble is displayed on the mobile device.

Various user activities may be employed via the mobile device. For example, the user can view, like, comment on, and/or purchase the ensemble via the mobile device. In one embodiment, the user purchases the ensemble via the mobile device and the ensemble is automatically shipped to the user.

Example Embodiments of a User Interaction with an Ensemble

As described above, user activity may be automatically stored in storage 160. System 100, in one embodiment, is a cloud environment such that user activities stored in storage 160 may be accessed from various locations and/or devices.

For example, a user views dashboard 131 via a first device (e.g., personal computer, laptop, tablet, smart phone, etc.).

Additionally, for example, user activity or dashboard 131 stored in storage 160 may be accessed via a device, such as a kiosk, at a brick-and-mortar store of retailer 110. In such an example, a store employee may access the "retail cloud" and assist the user based on the accessed user activity (e.g., viewed ensembles, liked ensembles, purchased ensembles, etc.).

Example Embodiments of Item Replacement Matching

In some instances, one or more items in an ensemble become out of stock and are unavailable for purchase. When an item in an ensemble is unavailable the ensemble, as a whole, is unavailable. Rather than restock the out of stock item, the retailer, in various embodiments, replaces the out of stock item with a new similar item.

The retailer may replace the out of stock item and/or the associated assemble by various methods. For instance, referring to FIG. 2A, if pants 204 (of ensemble 200A) are out of stock then pants 204 and ensemble 200A are unavailable.

A replacement item (e.g., replacement pants) to pants 204 may be provided. The replacement item may be included within ensemble 200A. The replacement item, in one embodiment, may be introduced in a new ensemble that is similar to ensemble 200A.

Various analyses may be provided to generate the replacement item. For example, if pants 204 are unavailable for purchase, then user activity associated with pants 204 is accessed and analyzed. The information related to the user activity may be, but not limited to, purchase data, number of likes, user comments, etc.

In view of the analyzed user activity information, a replacement item that is similar to the unavailable item is created and presented to users to peruse, purchase, or utilize to build other ensembles.

Additionally, a color palette analysis may be performed on the unavailable item. For example, if the color palette of the unavailable item includes blue and red, then the replacement item may include a color palette that is similar to the unavailable item.

Example Methods of Operation

The following discussion sets forth in detail the operation of some example methods of operation of embodiments. With reference to FIGS. 4-11, flow diagrams 400-1100 illustrate example procedures used by various embodiments. Flow diagrams 400-1100 include some procedures that, in various embodiments, are carried out by a processor under the control of computer-readable and computer-executable instructions. In this fashion, procedures described herein and in conjunction with flow diagrams 400-1100 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments. The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 400-1100, such procedures are examples. That is, embodiments are well suited to performing various other procedures or variations of the procedures recited in flow diagrams 400-1100. Likewise, in some embodiments, the procedures in flow diagrams 400-1100 may be performed in an order different than presented and/or not all of the procedures described in one or more of these flow diagrams may be performed. It is further appreciated that procedures described in flow diagrams 400-1100 may be implemented in hardware, or a combination of hardware with firmware and/or software.

Figure 4:
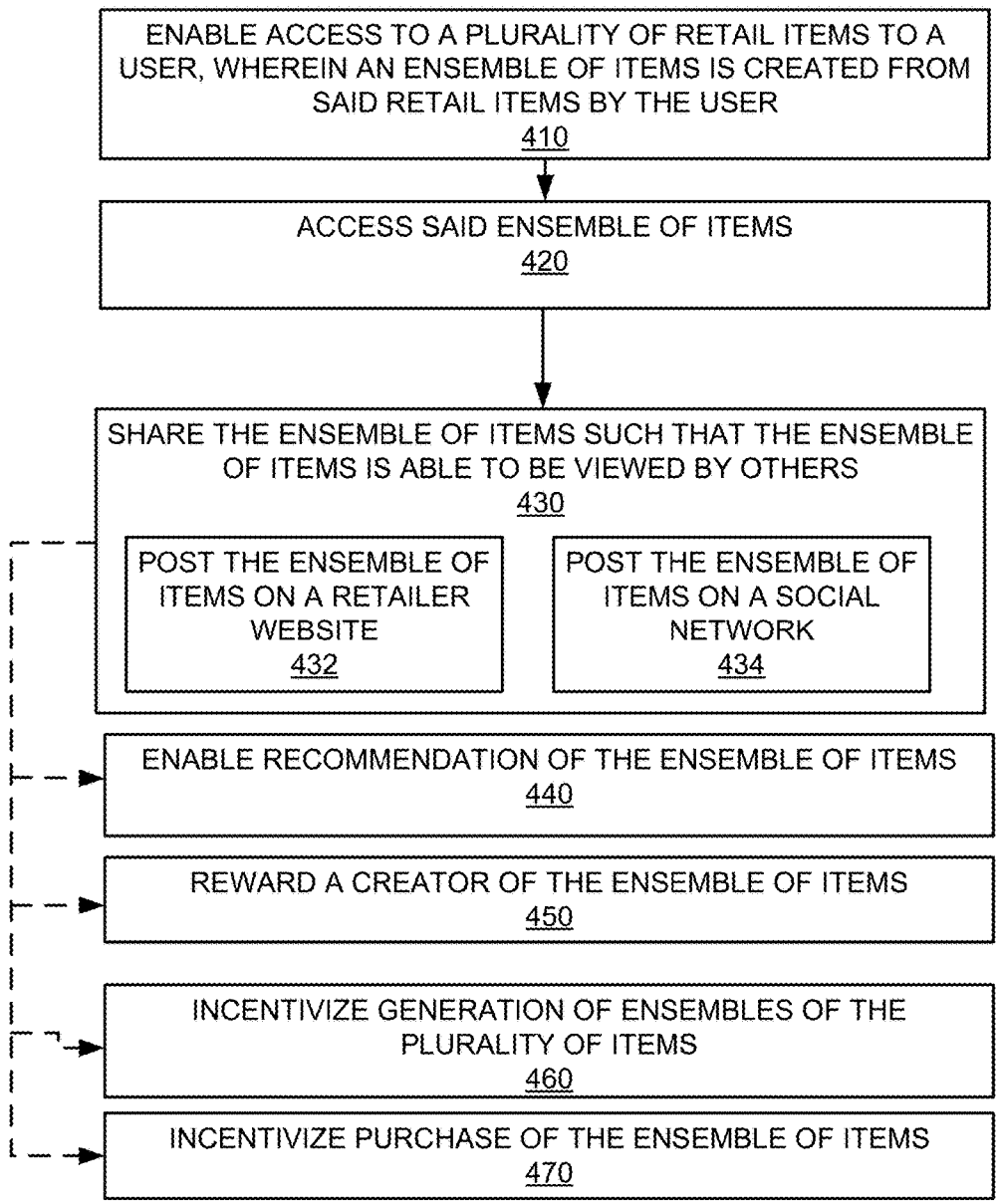
FIG. 4 depicts a flow diagram for a method for generating an ensemble of items, according to various embodiments.

FIG. 4 depicts a process flow diagram 400 for a method for generating an ensemble of items, according to various embodiments.

At 410, access to a plurality of retail items is enabled to a user, wherein an ensemble of items is created from said retail items by the user. For example, user 152 views retail items 112 on a website of retailer 110 via device 170 (e.g., mobile device, desktop computer, etc.). User 152 then generates ensemble 200A comprising a subset of retail items 112.

At 420, the ensemble of items is accessed. For example, ensemble 200A created by user 152 is stored in storage 160. System 100 is then able to access the crated ensemble for subsequent sharing, as described below.

At 430, the ensemble of items is shared such that the ensemble of items is able to be viewed by others. Upon creation of ensemble 200A, the ensemble is shared such that other users (e.g., users 150) are able to view ensemble 200A.

At 432, in one embodiment, the ensemble of items is posted on a retailer website. For example, the user creates the ensemble on the retailer website and subsequently posts the ensemble such that is publicly viewable.

At 434, in another embodiment, the ensemble of items is posted on a social network. For example, the user creates the ensemble on the user website and subsequently posts the ensemble on social network 140 such that is viewable by friends of user 152 on the social network. The ensemble may also be publicly posted on the social network.

At 440, recommendation of the ensemble of items is enabled. For example, viewers of ensemble 200A are able to "like" the ensemble or post comments to the shared ensemble.

At 450, a creator of the ensemble of items is rewarded. For example, user activity module 130 tracks the user activity of ensemble 200A. If the ensemble receives a pre-determined number of views or likes, then rewards module 132 rewards the user 152 with various rewards, such as early or priority access to future lines of apparel.

At 460, generation of ensembles of the plurality of items is incentivized. For example, the creator of the ensemble receives points for each view of an ensemble. If the creator receives a number of points, then the creator may receive various rewards, such as early access to lines of apparel. As a result, the user has incentive to create quality and popular ensembles.

At 470, purchase of the ensemble of items is incentivized. For example, a retailer may employ a pricing scheme wherein if a user purchases three items in an ensemble, then a discount (e.g., 10% off) is provided for additional purchased items in the ensemble.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

Figure 5:
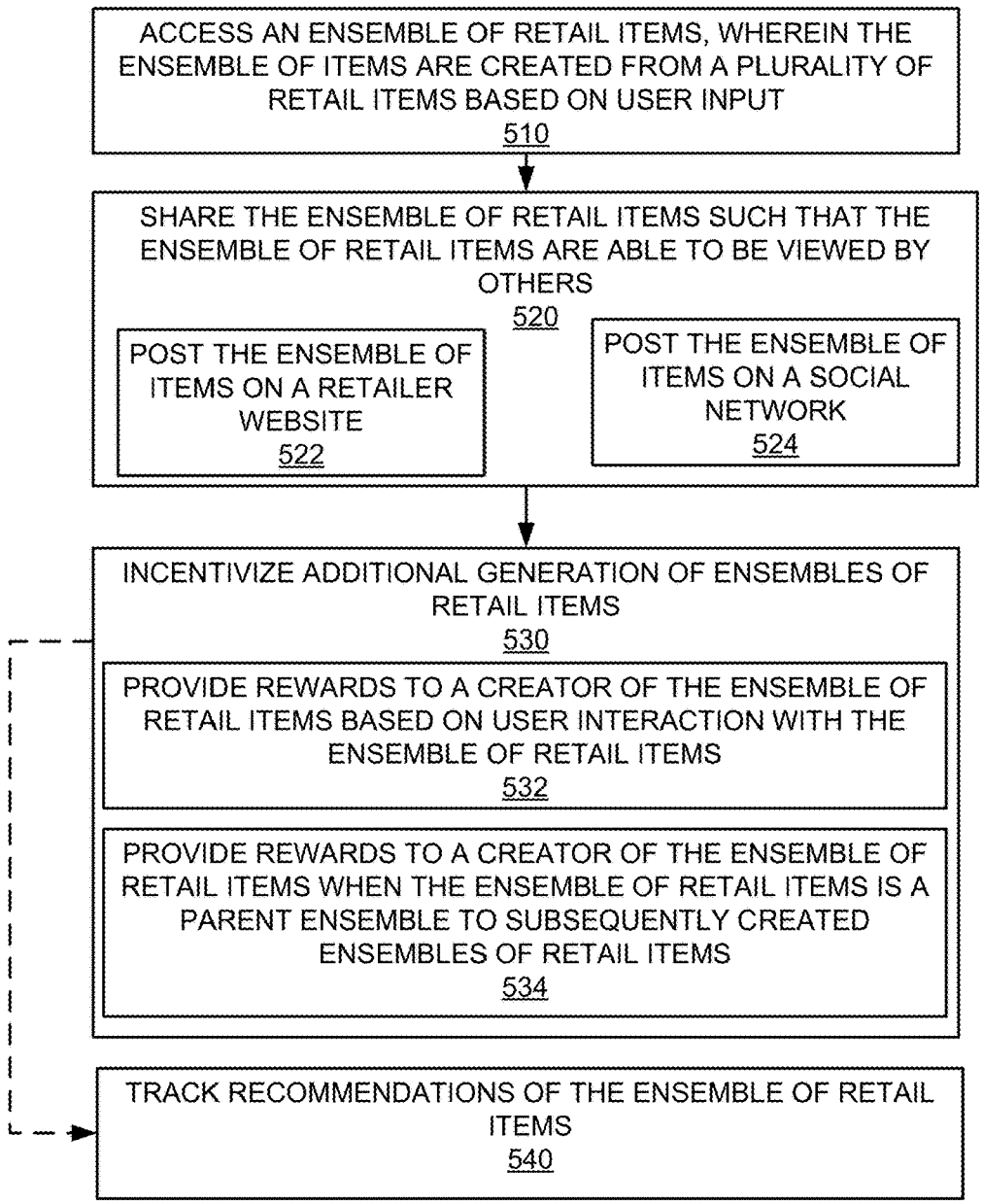
FIG. 5 depicts a flow diagram for a method for incentivizing generation of ensembles of retail items, according to various embodiments.

FIG. 5 depicts a process flow diagram 500 for a method for incentivizing generation of ensembles of retail items, according to various embodiments.

At 510, an ensemble of retail items of a plurality of retail items is generated based on user input. For example, user 152 creates ensemble 120-1 via the website of retailer 110. In particular, user 152 views retail items 112 and select particular items of retail items 112 to create a coordinated collection of items (i.e., an ensemble).

At 520, the ensemble of retail items is shared such that the ensemble of retail items is able to be viewed by others. For example, ensemble 120-1 is created on a retailer's website and subsequently shared such that others (e.g., users 150) are able to view the ensemble.

At 522, in one embodiment, the ensemble of items is posted on a retailer website. For example, the user creates the ensemble on the retailer website and subsequently posts the ensemble such that is publicly viewable.

At 524, in another embodiment, the ensemble of items is posted on a social network. For example, the user creates the ensemble on the user website and subsequently posts the ensemble on social network 140 such that is viewable by friends of user 152 on the social network. The ensemble may also be publicly posted on the social network.

At 530, additional generation of ensembles of retail items is incentivized. For example, the creator of the ensemble receives points for each view of an ensemble. If the creator receives a number of points, then the creator may receive various rewards, such as early access to lines of apparel. As a result, the user has incentive to create quality and popular ensembles.

At 532, in one embodiment, rewards are provided to a creator of the ensemble of retail items based on user interaction with the ensemble of retail items. For example, a creator of an ensemble earns points for every view of the ensemble. If the creator earns a requisite number of points then the creator may receive various rewards, such as early access to subsequent lines of apparel.

At 534, in another embodiment, rewards are provided to a creator of the ensemble of retail items when the ensemble of retail items is a parent ensemble to subsequently created ensembles of retail items. For example, ensemble 200A is a parent ensemble to ensemble 200B, as described above. As a result, the creator of ensemble 200A receives fractions of points for every point that is attributed to ensemble 200B.

At 540, recommendations of the ensemble of retail items are tracked. For example, user activity module 130 tracks recommendations (e.g., "likes") for ensembles 120.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

Figure 6:
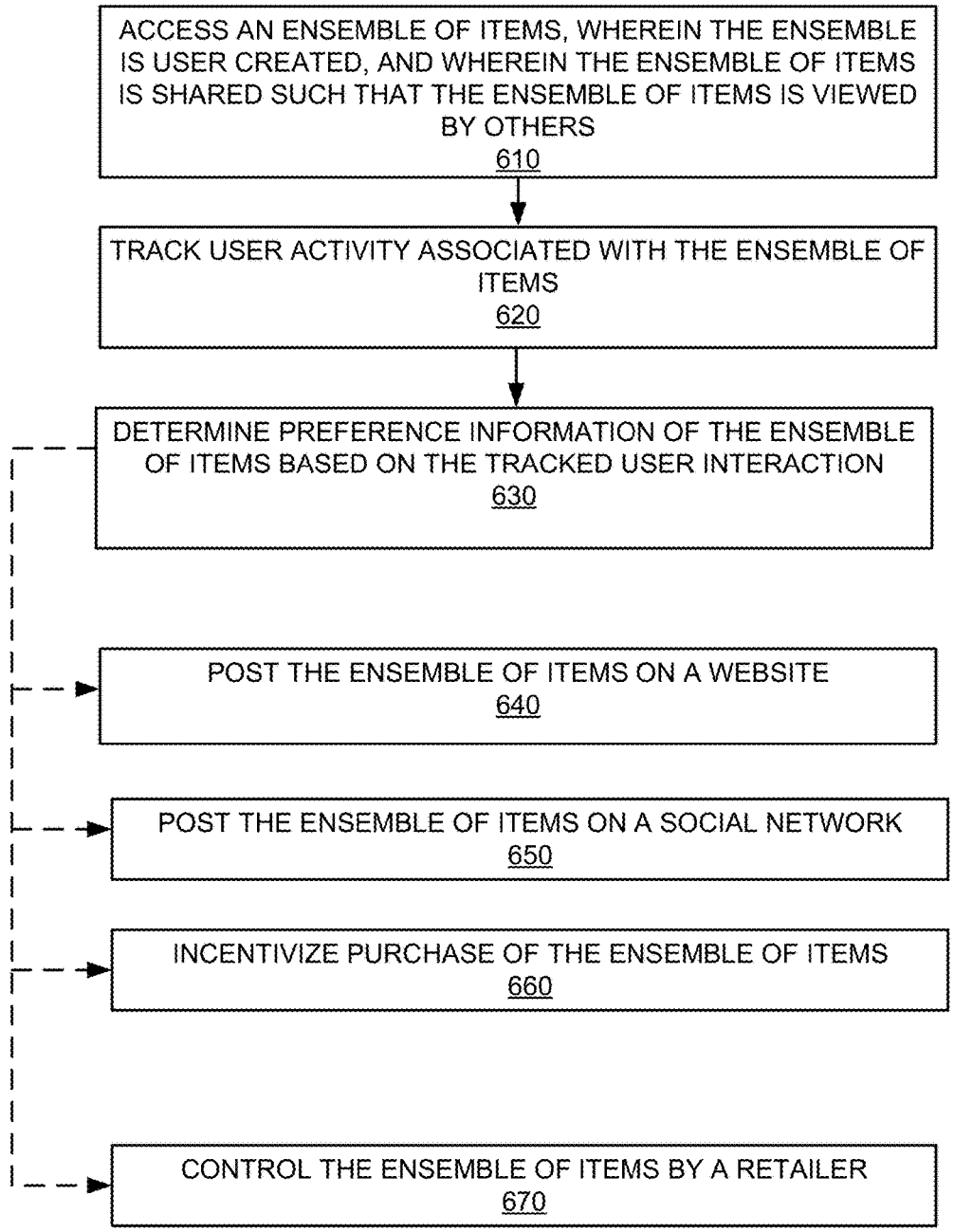
FIG. 6 depicts a flow diagram for a method for determining preferences of an ensemble of items, according to various embodiments.

FIG. 6 depicts a process flow diagram 600 for a method for determining preferences of an ensemble of items, according to various embodiments.

At 610, an ensemble of items is accessed, wherein the ensemble is user created, and wherein the ensemble of items is shared such that the ensemble of items is viewed by others. For example, users 150 access ensembles 120 to view the ensembles.

At 620, user activity associated with the ensemble of items is tracked. For example, user activity module 130 tracks the user activity of users 150 that view ensembles 120.

At 630, preference information of the ensemble of items is determined based on the tracked user interaction. For example, ensemble preference data module 134 determines preferences of ensembles based on the user activity of users 150 view the ensembles. More specifically, preferences of ensembles may be determined based on how many views or likes of an ensemble.

At 640, the ensemble of items is posted on a website. For example, the user creates the ensemble on the retailer ecommerce website and subsequently posts the ensemble such that is publicly viewable on the retailer ecommerce website.

At 650, the ensemble of items is posted on a social network. For example, the user creates the ensemble on the user website and subsequently posts the ensemble on social network 140 such that is viewable by friends of user 152 on the social network. The ensemble may also be publicly posted on the social network.

At 660, purchase of the ensemble of items is incentivized. For example, a retailer may employ a pricing scheme wherein if a user purchases three items in an ensemble, then a discount (e.g., 10% off) is provided for additional purchased items in the ensemble.

At 670, the ensemble of items is controlled by a retailer. For example, retailer 110 limits the visibility of a poorly created ensemble having a low sense of fashion and that is not desirable by others.

It is noted that any of the procedures, stated above, regarding flow diagram 600 may be implemented in hardware, or a combination of hardware with firmware and/or software. For example, any of the procedures are implemented by a processor(s) of a cloud environment and/or a computing environment.

FIG. 7 depicts a process flow diagram 700 for a method for retailer control of ensembles of retail items according to various embodiments.

At 710, ensembles of retail items are accessed, wherein the retail items are provided by a retailer, and wherein the ensembles of retail items are created by entities other than the retailer. For example, ensembles 120 are accessed by retailer 110 such that the retailer is aware of the ensembles created on its website.

At 720, the ensembles of retail items are controlled by the retailer. For example, retailer 110 limits the user visibility or awareness of a poorly created ensemble having a low sense of fashion and that is not desirable by others.

At 722, recommendations of the ensembles are controlled. For example, retailer 110 may limit the number of likes of an undesirable ensemble.

At 724, display of the ensembles is controlled. For example, retailer 110 may not allow an undesirable ensemble to be displayed.

At 726, recommendation significance is provided to the retailer that is higher than a recommendation significance to other viewers of the ensembles. For example, retailer 110 may have a "super like" that is ten times the value of a conventional "like" provided by a user. As such, the retailer may significantly increase the recommendations of desirable ensembles over undesirable ensembles.

At 728, rankings of the ensembles are controlled with respect to each other. For example, if an undesirable ensemble is ranked higher than more desirable ensembles, then the retailer may automatically lower the rankings of the undesirable ensemble such that it has less prominence.

At 730, purchase of the ensemble of items is incentivized. For example, a retailer may employ a pricing scheme wherein if a user purchases three items in an ensemble, then a discount (e.g., 10% off) is provided for additional purchased items in the ensemble.

It is noted that any of the procedures, stated above, regarding flow diagram 700 may be implemented in hardware, or a combination of hardware with firmware and/or software. For example, any of the procedures are implemented by a processor(s) of a cloud environment and/or a computing environment.

Figure 8:
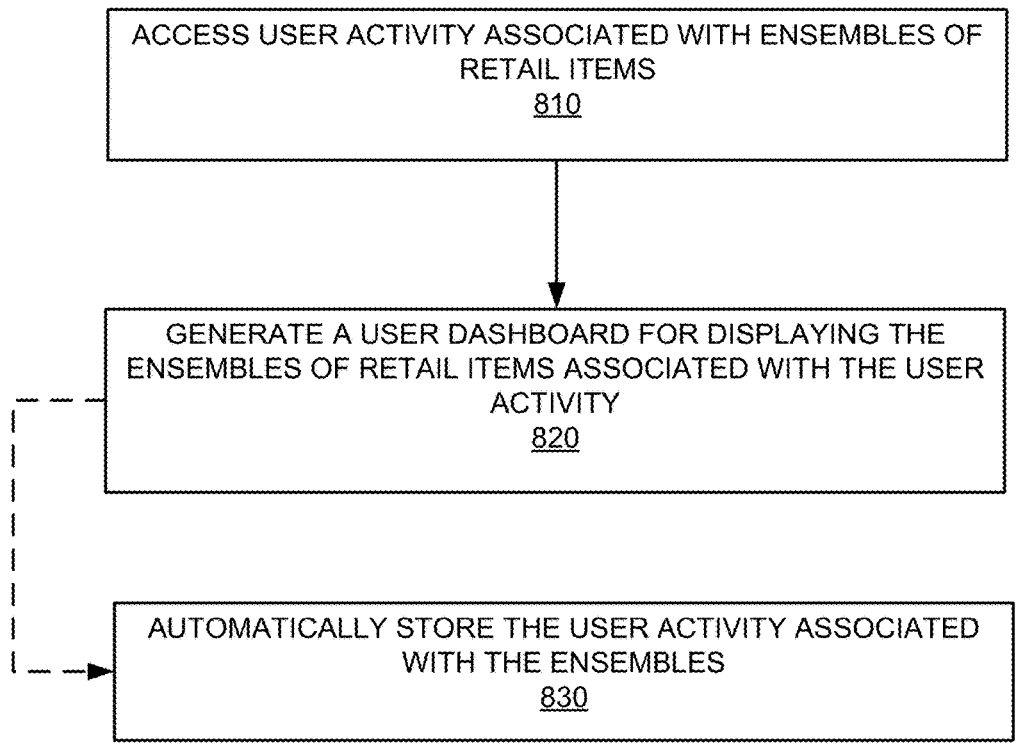
FIG. 8 depicts a flow diagram for a method for generating a user dashboard associated with ensembles of retail items, according to various embodiments.

FIG. 8 depicts a process flow diagram 800 for a method for generating a user dashboard associated with ensembles of retail items, according to various embodiments.

At 810, user activity associated with ensembles of retail items is accessed. For example, user activity obtained by user activity module 130 is stored in storage 160 and subsequently accessed from storage 160.

At 820, a user dashboard is generated for displaying the ensembles of retail items associated with the user activity. For example, dashboard 300 is created that displays various attributes of user activity, such as the ensembles the user created, ensembles liked, etc.

At 830, the user activity associated with the ensembles is automatically stored. For example, user activity obtained by user activity module 130 is automatically stored in storage 160.

It is noted that any of the procedures, stated above, regarding flow diagram 800 may be implemented in hardware, or a combination of hardware with firmware and/or software. For example, any of the procedures are implemented by a processor(s) of a cloud environment and/or a computing environment.

Figure 9:
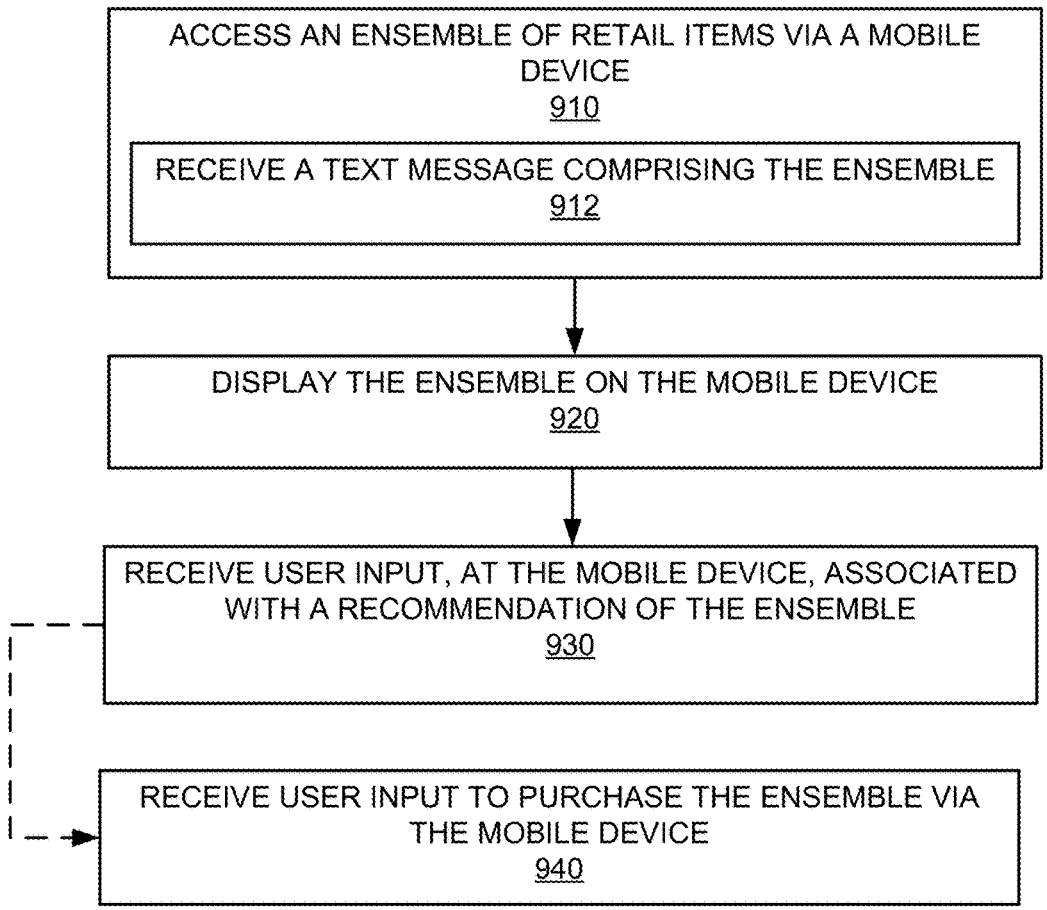
FIG. 9 depicts a flow diagram for a method for user interaction with an ensemble of items via a mobile device, according to various embodiments.

FIG. 9 depicts a process flow diagram 900 for a method for user interaction with an ensemble of items via a mobile device, according to various embodiments.

At 910, an ensemble of retail items is accessed via a mobile device. For example, ensemble 200A is accessed via a smart phone of user 152.

At 912, in one embodiment, a text message comprising the ensemble is received. For example, user 154 sends user 152 a text that includes ensemble 200A that was created by user 154.

At 920, the ensemble is displayed on the mobile device. For instance, ensemble 200A sent as a text to user 152 is displayed on the mobile device of user 152.

At 930, user input is received at the mobile device that associated with a recommendation of the ensemble. For example, ensemble 200A is displayed on device 170, user 152 views the ensemble on device 170 and "likes" the ensemble via device 170.

At 940, user input is received to purchase the ensemble via the mobile device. For example, ensemble 200A is displayed on device 170. User 152 views the ensemble on device 170 and purchases the ensemble via device 170.

It is noted that any of the procedures, stated above, regarding flow diagram 900 may be implemented in hardware, or a combination of hardware with firmware and/or software. For example, any of the procedures are implemented by a processor(s) of a cloud environment and/or a computing environment.

Figure 10:
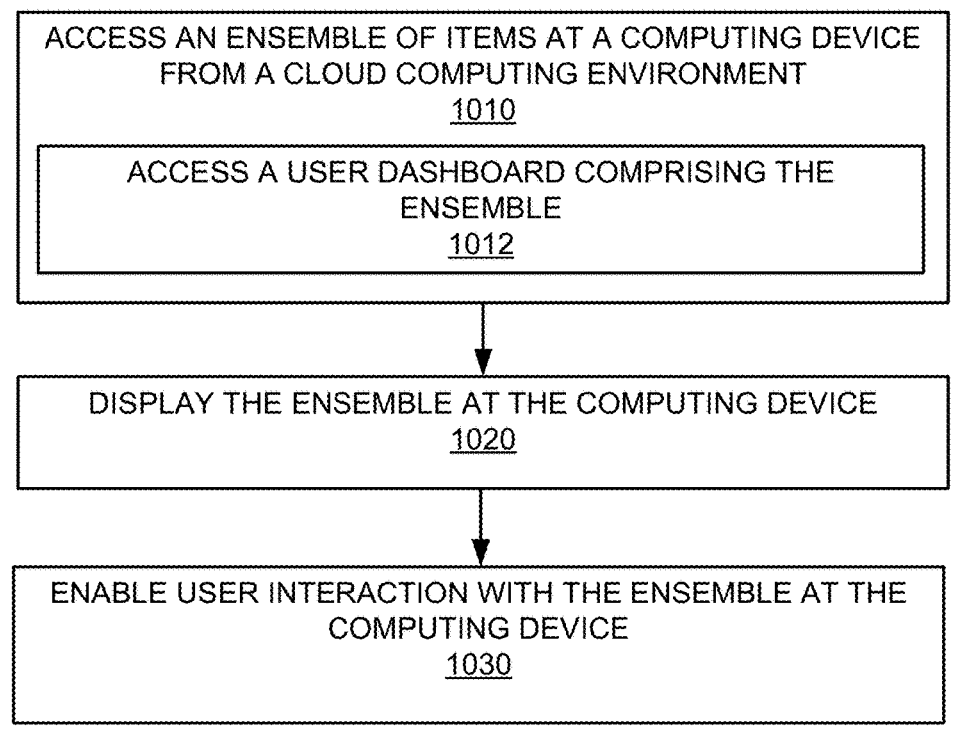
FIG. 10 depicts a flow diagram for a method for user interaction of an ensemble of items, according to various embodiments.

FIG. 10 depicts a process flow diagram 1000 for a method for user interaction of an ensemble of items, according to various embodiments.

At 1010, an ensemble of items is accessed at a computing device from a cloud computing environment. For example, system 100 is a cloud environment. As such, ensembles 120, for example, stored in storage 160, are able to be accessed from various devices, such as device 170.

At 1012, in one embodiment, user dashboard 300 is accessed that comprises ensembles 302, 304 and 306 which are "liked" by the user.

At 1020, the ensemble is displayed at the computing device. For example, dashboard 300 is displayed that includes various ensembles associated with user activity of the user.

At 1030, user interaction with the ensemble is enabled at the computing device. For example, dashboard 300 is displayed at a kiosk at a retail store. As such, the user and/or employee at the retail store may view and/or interact with dashboard 300.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 for a method for replacement item matching, according to various embodiments.

At 1110, an item in an ensemble of items is determined to be unavailable for purchase. For example, pants 204 of ensemble 200A is out of stock and unavailable for purchase.

At 1120, user activity associated with the item is analyzed. For example, user activity such as, purchase data, the number of view, amount of time viewed, and number of likes are analyzed with respect to pants 204 that are out of stock.

At 1130, a replacement item similar to the item that is unavailable for purchase is presented, wherein the replacement item is generated based, in part, on the analyzing. For example, a replacement pants for pants 204 is displayed to users. The replacement pants are similar to pants 204. Additionally, the creation of the replacement pants is based, at least in part, on various user activity information (e.g., purchase data, the number of view, amount of time viewed, and number of likes).

At 1140, a color palette analysis of the item is performed, wherein the replacement item is generated based, in part, on the color palette analysis. For instance, pants 204 that are out of stock includes a yellow and red color. The color palette analysis determines the particular yellow and red color of pants 204. The colors obtained in the color palette analysis are utilized in the creation of the new replacement pants.

Example embodiments of the subject matter are thus described. Although various embodiments of the have been described in a language specific to features and/or methodological acts, it is to be understood that the appended claims are not necessarily limited to the specific features or acts described above. Rather, the specific features and acts described above are disclosed as example forms of implementing the claims and their equivalents. Moreover, examples and embodiments described herein may be implemented alone or in various combinations with one another.

The invention claimed is:

1. A non-transitory computer-readable storage medium having instructions embodied therein that when executed cause a computer system to perform a method for determining preferences of an ensemble of items, the method comprising:
   accessing, by said computer system, a first ensemble of items, created by a first user and posted on a social network, said first ensemble of items viewable by a plurality of persons other than said first user on a display of said computer system;
   accessing, by said computer system, a second ensemble of items, created by a second user and posted on the social network, said second ensemble of items viewable by a plurality of persons other than said second user on the display of said computer system;
   tracking, by said computer system, an activity of the plurality of persons other than said first user and said second user, associated with said first ensemble of items and said second ensemble of items on the social network;
   determining, by said computer system, preference information of said first ensemble of items and said second ensemble of items based on said activity of said plurality of persons other than said first user and said second user;
   receiving, at said computer system, a retailer preference information about said first ensemble of items and said second ensemble of items, a value of the retailer preference information having a value that is ten times the preference information received from the plurality of persons;
   ranking said first ensemble of items and said second ensemble of items based on said preference information of said plurality of persons,
      said ranking removing access to any of said first ensemble of items or said second ensemble of items on the social network, when an undesirable ranking is obtained,
      said ranking limiting a visibility of a lower ranked of said first ensemble of items or said second ensemble of items on the social network, and
      said ranking increasing the visibility of a higher ranked of said first ensemble of items or said second ensemble of items on the social network; and
   providing a progressive discount at a time of purchase,
      the progressive discount being directly related to number of items purchased from the first ensemble of items, and
      the progressive discount being directly related to number of items purchased from the second ensemble of items.

2. The non-transitory computer-readable storage medium of claim 1, wherein said preference information is determined prior to an actual purchase of said first ensemble of items or said second ensemble of items.

3. The non-transitory computer-readable storage medium of claim 1, wherein said activity of said plurality of persons other than said first user and said second user is selected from a group consisting of: number of views, number of likes, and number of purchases.

4. The non-transitory computer-readable storage medium of claim 1, wherein said preference information is selected from a group consisting of: sizes of items in said first ensemble of items and said second ensemble of items and colors of items in said first ensemble of items and said second ensemble of items.

5. The non-transitory computer-readable storage medium of claim 1, wherein one or both of said first ensemble of items and said second ensemble of items comprise items from a single retailer.

6. The non-transitory computer-readable storage medium of claim 1, comprising:
   providing said first ensemble of items to one or more of the plurality of persons associated with the first user on the social network; and
   providing said second ensemble of items to one or more of the plurality of persons associated with the second user on the social network.

7. The non-transitory computer-readable storage medium of claim 1, comprising:
   creating one or both of said first ensemble of items and said second ensemble of items on a website of a single retailer.

8. The non-transitory computer-readable storage medium of claim 1, comprising:
   incentivizing a purchase of one or both of said first ensemble of items and said second ensemble of items by a retailer.

9. The non-transitory computer-readable storage medium of claim 1, comprising:
   controlling the display of said first ensemble of items and said second ensemble of items by a retailer.

10. The non-transitory computer-readable storage medium of claim 1, wherein said first ensemble of items and said second ensemble of items are selected from a group of: clothing, accessories, home furnishings, and cosmetics.

11. A computer-implemented method for retailer control of ensembles of retail items, comprising:
   accessing, by a computer processor, a first ensemble of retail items created by a first user and posted on a social network;
   accessing, by said computer processor, a second ensemble of retail items created by a second user and posted on the social network;

receiving, at said computer processor and from the social network, preference information about said first ensemble of retail items and said second ensemble of retail items from a plurality of persons other than said first user and said second user;

receiving, at said computer processor, a retailer preference information about said first ensemble of retail items and said second ensemble of retail items, wherein a value of the retailer preference information has a value that is ten times the preference information received from the plurality of persons;

ranking, by said computer processor, said first ensemble of retail items and said second ensemble of retail items based on said preference information from the plurality of persons other than said first user and said second user;

controlling, by a retailer, access to said first ensemble of retail items and said second ensemble of retail items based on a result of said ranking, said controlling
 removing access to any of said first ensemble of retail items or said second ensemble of retail items from the social network, when an undesirable ranking is obtained,
 limiting a visibility of a lower ranked of said first ensemble of retail items or said second ensemble of retail items on the social network, and
 increasing the visibility of a higher ranked of said first ensemble of retail items or said second ensemble of retail items on the social network; and
 providing a progressive discount at a time of purchase, wherein a number of retail items purchased from the first ensemble of retail items or the second ensemble of retail items is directly related to a size of the progressive discount.

12. The computer-implemented method of claim 11, wherein said controlling further comprises:
 providing recommendation significance to a higher ranked of said first ensemble of retail items or said second ensemble of retail items.

13. The computer-implemented method of claim 11, comprising:
 incentivizing purchase of said first ensemble of retail items or said second ensemble of retail items by said retailer.

14. The computer-implemented method of claim 11, wherein said first ensemble of retail items and said second ensemble of retail items are created on a retailer website.

15. The computer-implemented method of claim 11, wherein said first ensemble of retail items is displayed only to one or more of the plurality of persons associated with the first user on the social network; and
 said second ensemble of retail items is displayed only to one or more of the plurality of persons associated with the second user on the social network.

16. The computer-implemented method of claim 11, wherein one or both of said first ensemble of retail items and said second ensemble of retail items comprise items from a single retailer.

* * * * *